(12) United States Patent
Blackburn et al.

(10) Patent No.: US 8,716,670 B2
(45) Date of Patent: May 6, 2014

(54) METHODS AND APPARATUS FOR INTEGRATED NEUTRON/GAMMA DETECTOR

(75) Inventors: Brandon W. Blackburn, Idaho Falls, ID (US); Michael V. Hynes, Cambridge, MA (US); Anthony G. Galaitsis, Lexington, MA (US); Bernard Harris, Wayland, MA (US); Erik D. Johnson, Boston, MA (US); Bruce William Chignola, Marlborough, MA (US)

(73) Assignee: Raytheon Company, Waltham, MA (US)

( * ) Notice: Subject to any disclaimer, the term of this patent is extended or adjusted under 35 U.S.C. 154(b) by 354 days.

(21) Appl. No.: 13/339,571

(22) Filed: Dec. 29, 2011

(65) Prior Publication Data

US 2013/0168566 A1     Jul. 4, 2013

(51) Int. Cl.
*G01T 3/06* (2006.01)

(52) U.S. Cl.
USPC ..................................................... 250/390.11

(58) Field of Classification Search
USPC ..................................................... 250/390.11
See application file for complete search history.

(56) References Cited

U.S. PATENT DOCUMENTS

| 4,639,349 A * | 1/1987 | Baratta et al. ............... 376/254 |
| 6,930,311 B1 | 8/2005 | Riel |
| 7,629,588 B1 | 12/2009 | Bell et al. |
| 7,872,750 B1 | 1/2011 | Wrbanek et al. |
| 2010/0038551 A1 | 2/2010 | Bell et al. |
| 2010/0258735 A1 | 10/2010 | Weissman et al. |
| 2010/0258736 A1 | 10/2010 | McCormick et al. |
| 2011/0024639 A1 | 2/2011 | Dazeley |
| 2012/0307952 A1* | 12/2012 | Wilson ........................ 376/153 |

FOREIGN PATENT DOCUMENTS

| GB | 901661 | 7/1962 |
| GB | 1 131 406 A | 10/1968 |
| WO | WO 2011/144843 A1 | 11/2011 |

OTHER PUBLICATIONS

Notification of Transmittal of the International Search Report and the Written Opinion of the International Searching Authority, or the Declaration, PCT/US2012/067004, date of mailing Dec. 6, 2013, 6 pages.
Written Opinion of the International Searching Authority, PCT/US2012/067004, date of mailing Dec. 6, 2013, 8 pages.
O'Keeffe H M et al.: "Four Methods for Determining the Composition of Trace Radioactive Surface Contamination of Low-Radioactivity Metal", Nuclear Instruments & Methods in Physics Research. Section A: Accelerators, Spectrometers, Detectors, and Associated equipment, Elsevier BV * North-Holland, Netherlands, vol. 659, No. 1, Aug. 25, 2011, pp. 182-192, XP028101344, ISSN: 0168-9002, DOI: 10.1016/J.NIMA.2011.08.060 [retrieved on Sep. 8, 2011] p. 182, paragraph first; figure 4.
R. Morse, "Search for Proton Decay—The HPW Deep Underground Water Cerenkov Detector" Physics Department, University of North Carolina, Apr. 15-17, 1982, Abstract, p. 174 (1 page).

* cited by examiner

*Primary Examiner* — David Porta
*Assistant Examiner* — Hugh H Maupin
(74) *Attorney, Agent, or Firm* — Daly, Crowley, Mofford & Durkee, LLP (57) ABSTRACT

Methods and apparatus for a detector system to detect gamma and neutron radiation. In one embodiment, a detector comprises a tank to hold a liquid, a plurality of tubes adjacent the tank to detect neutrons, and a plurality of photon detectors to detect Cherenkov light generated by gamma radiation in the liquid. The tank is configured to contain the liquid so that the liquid generates the Cherenkov light and moderates the neutrons.

13 Claims, 13 Drawing Sheets

| Energy at Incident gamma (MeV) | Efficiency gamma detector | Efficiency gamma/neutron detector | Ratio gamma to g/n | Loss % |
|---|---|---|---|---|
| 3 | 0.747 | 0.633 | 0.85 | 15.17 |
| 5 | 0.673 | 0.602 | 0.89 | 10.55 |
| 7 | 0.625 | 0.606 | 0.97 | 3.04 |
| 10 | 0.578 | 0.578 | ~1.00 | ~0.00[b] |

METHODS AND APPARATUS FOR INTEGRATED NEUTRON/GAMMA DETECTOR

STATEMENT REGARDING FEDERALLY SPONSORED RESEARCH

This invention was made with government support under Contract No. HDTRA1-10-C-0002 awarded by the Defense Threat Reduction Agency. The government has certain rights in the invention.

BACKGROUND

As is known in the art, a Cherenkov detector is a particle detector using the mass-dependent threshold energy of Cherenkov radiation to allow discrimination between a lighter particle, which does radiate, and a heavier particle, which does not radiate. A particle passing through a material at a velocity greater than that at which light can travel through the material emits light in the form of Cherenkov radiation. This light is emitted in a cone about the direction in which the particle is moving. The angle of the cone, $\theta_c$, is a direct measure of the particle's velocity through the formula $$\cos\theta_c = \frac{c}{nv},$$

where c is the speed of light, and n is the refractive index of the medium.

Gamma radiation or gamma rays refer to electromagnetic radiation of high frequency (very short wavelength) produced by decay of high energy states in atomic nuclei and high energy sub-atomic particle interactions in natural and man-made processes, such as electron-positron annihilation, neutral pion decay, fusion, fission, lightning strike and terrestrial gamma-ray flash, and astronomical sources in which high-energy electrons are produced. These electrons then produce secondary gamma rays by the mechanisms of bremsstrahlung, inverse Compton scattering and synchrotron radiation. Gamma ray events range from production of a single gamma photon in nuclear decay processes, to explosive bursts of gamma rays in the universe.

As a rule of thumb, gamma rays typically have frequencies above 10 exahertz ($>10^{19}$ Hz), with energies above 100 keV and wavelength less than 10 picometers, i.e., less than the diameter of an atom. Gamma rays from radioactive decay have energies of a few hundred keV, and almost always less than 10 MeV. Energies from astronomical sources can be much higher, ranging over 10 TeV.

Gamma rays and x-rays are typically distinguished by their origin with X-rays emitted by electrons outside the nucleus, and gamma rays emitted by the nucleus. Exceptions include high energy processes other than radioactive decay, which are still referred to as sources of gamma radiation, such as extremely powerful bursts of high-energy radiation known as long duration gamma ray bursts resulting from the collapse of stars called hypernovas.

A variety of Cherenkov detectors are known. For example, glass scintillators for thermal neutron detection use Li-loaded silicate glass or Li-loaded glass fibers for neutron detection. One disadvantage with Li-loaded glass scintillators is that the neutron response is not well distinguishable from the gamma response when there is a high gamma flux.

Cherenkov light is emitted when a charged particle, such as an electron or a positron, moves faster than the speed of light in a medium. Gamma and x rays of sufficient energy can produce Cherenkov light indirectly by liberating electrons from atoms in the medium (Compton scattering and photoelectric effect) and by generating positrons (pair production).

Detection of Cherenkov light is desirable in high-energy physics applications, such as muon detection and very high-energy (>1 GeV) particle detection. Known detectors include ring imaging Cherenkov detectors made with glass gels of various index of refraction butted together and ordered according to index of refraction so that the Cherenkov cone developed in each section of gel is superimposed on all the others to form a ring of light that is indicative of the energy of the particle passing through the assembly.

Other known Cherenkov detectors use water to detect Cherenkov light caused by the interactions of neutrinos with electrons or nucleons. These interactions result in high-energy electrons that produce Cherenkov light.

In another conventional water Cherenkov detector, the water includes a neutron absorbing material. Neutrons passing through the water are captured by the neutron-absorbing material resulting in the emission of prompt gamma rays, which energize electrons to such an extent that the electrons produce Cherenkov light within the water.

U.S. Pat. No. 7,629,588 to Bell at al., which is incorporated herein by references, discloses an activator detector that detects neutrons using Cherenkov light. U.S. Patent Application Publication No. 2010/0265078 of Friedman, which is incorporated herein by reference, discloses a plasma panel based ionizing particle radiation detector.

To detect gamma radiation and perform neutron moderation in a conventional manner requires separate detection systems. While there are known liquid scintillators sensitive to both neutrons and photons, they are difficult to deploy due to toxicity and flammability. For example, most liquid scintillator detectors are xylene-based. Further, liquid scintillators are not scalable and quite expensive.

SUMMARY

The present invention provides methods and apparatus for an integrated gamma/neutron detector having a common volume of liquid, such as conditioned water, in which Cherenkov light is generated and neutrons are moderated. With this arrangement, a cost-effective and efficient gamma/neutron detector is provided with the use of toxic or flammable materials used in scintillator-type detectors. While exemplary embodiments of the invention are shown and described in conjunction with particular tank configurations and energy thresholds, it is understood that the invention is applicable to high energy detectors in general in which it is desirable to detect gamma and neutron energy.

In one aspect of the invention, a detector system comprises a tank to hold a liquid, a plurality of tubes adjacent the tank to detect neutrons, and a plurality of photon detectors to detect Cherenkov light generated by gamma radiation in the liquid, wherein the tank is configured to contain the liquid so that the liquid generates the Cherenkov light and moderates the neutrons.

The system can further include one or more of the following features: the plurality of tubes are contained in the tank, the liquid comprises conditioned water, the water is contained in the tank, the plurality of tubes comprises B-10 lined proportional tubes, the photon detectors include photo multipliers, and/or the detector has an energy threshold of about 300 keV.

In another aspect of the invention, a detector system comprises a means for detecting neutrons comprising tubes, and a means for detecting Cherenkov light generated by gamma radiation comprising liquid in a tank. The system can further include tubes contained in the tank.

In a further aspect of the invention, a method comprises using a combined volume of conditioned water for gamma detection and neutron moderation. The method can further include containing the water in a tank, employing a plurality of tubes adjacent the tank to detect neutrons, and/or employing a plurality of photon detectors to detect Cherenkov light generated by gamma radiation in the water.

BRIEF DESCRIPTION OF THE DRAWINGS

The foregoing features of this invention, as well as the invention itself, may be more fully understood from the following description of the drawings in which.

DETAILED DESCRIPTION

Figure 1:
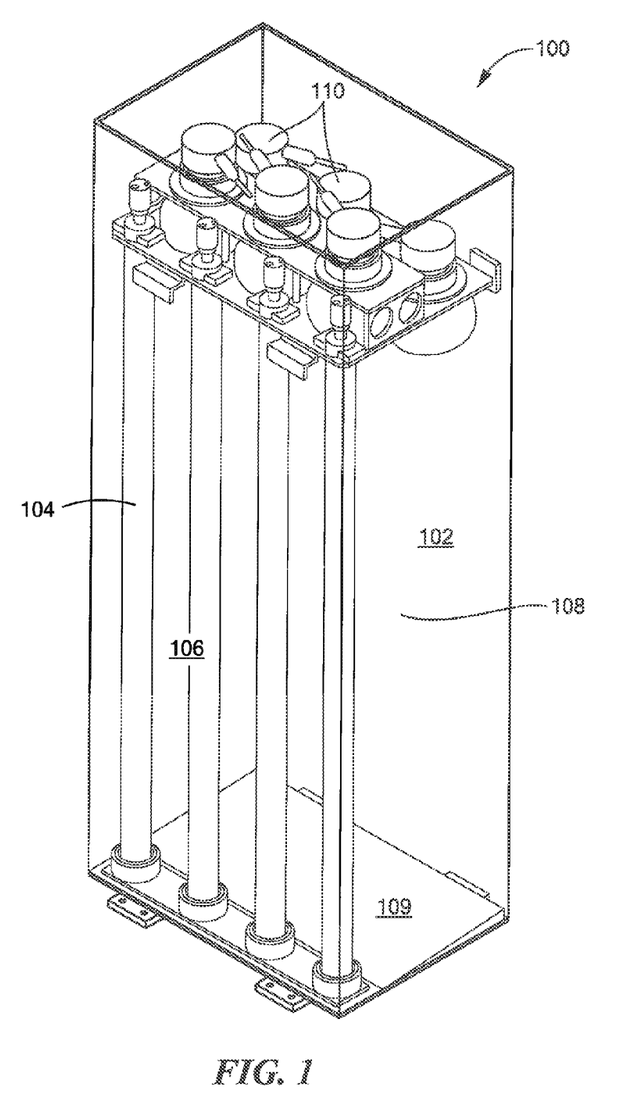
FIG. 1 is a schematic representation of a gamma/neutron detector in accordance with exemplary embodiments of the invention.

FIG. 1 shows an exemplary neutron/gamma detector 100 in accordance with exemplary embodiments of the invention. The detector 100 includes a gamma detector 102 and a neutron detector 104. In one embodiment, the gamma detector 102 includes a water Cherenkov detector and the neutron detector 104 includes Boron-lined (B-10) proportional tubes 106. Water 108 contained in a tank 109 results in the production of Cherenkov light from gamma radiation and performs neutron moderation. By using the water for gamma detection and neutron moderation, a relatively compact, cost effective, and scalable unit is provided.

In general, the integrated neutron/gamma detector 100 utilizes a large volume water Cherenkov detector 102 to collect gamma signatures through the generation of Cherenkov light in the water. High energy gamma-rays above 300 keV generate high energy electrons that emit Cherenkov light in the water 108. These visible photons are collected by a set of six, for example, photomultiplier (PMT) tubes 110 at the top of the tank. It is understood that any practical number of PMTs 110 can be used to meet the needs of a particular application. While the illustrative embodiments include the use of PMTs, it is further understood that any suitable sensor can be used to detect the Cherenkov light.

Figure 2:
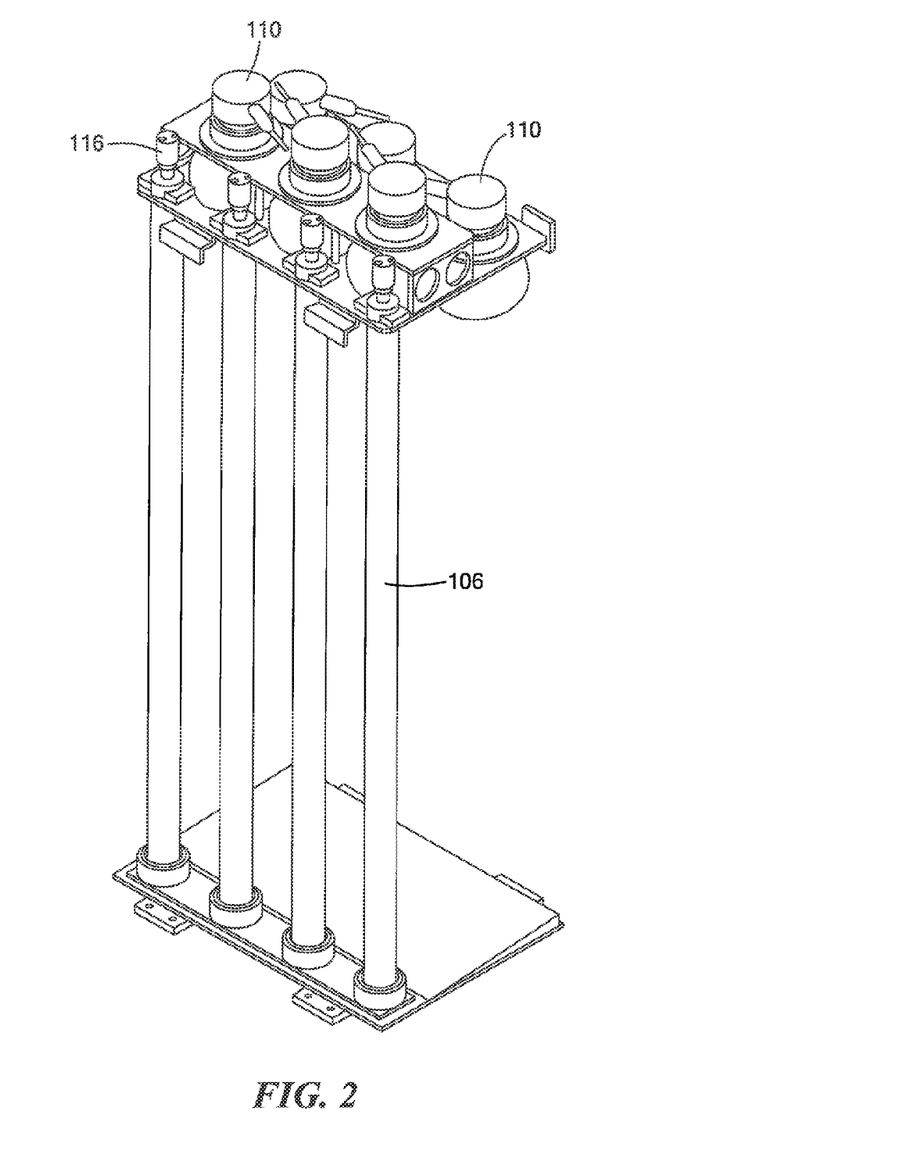
FIG. 2 is a schematic representation of a neutron detector portion of the detector of FIG. 1.

The B-10 lined proportional tubes 106 mounted to the front of the detector serve as the neutron detector 104. Because they are mounted in the front of the water 108 volume, the bulk of the required neutron moderation comes from the water Cherenkov detector 102.

The water Cherenkov detector 102 has a natural lower energy threshold of about 300 keV to provide natural filtering of the low energy gamma-rays for eliminating or reducing the possibility of pile-up due to background. The integrated B-10 detectors 106 utilize the water of the Cherenkov detector 102 as the primary moderator to reduce the overall size and weight of the detector, as compared to separate conventional detectors.

In one embodiment, the neutron detector 104 includes pre-amplifier devices 116 coupled to each of the Boron-lined tubes 106. It is understood that the Boron-lined tubes can be so-called B-10 type tubes. Other suitable tubes for detecting neutrons will be apparent to one of ordinary skill in the art. The tubes 106 can be secured in place with polyethylene or other suitable material.

Figure 3:
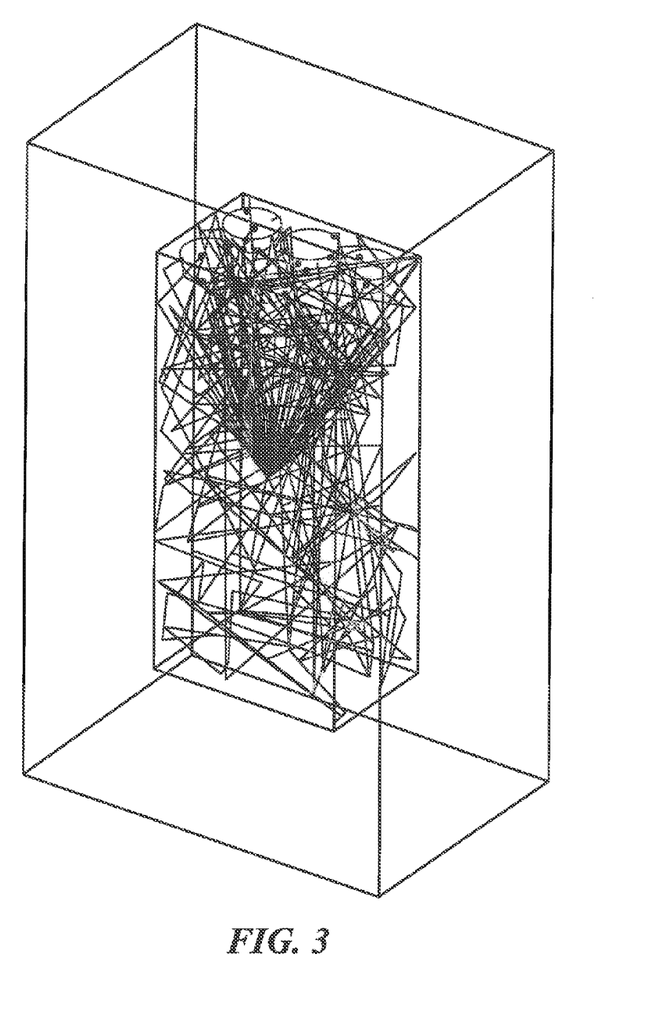
FIG. 3 is a pictorial representation of Cherenkov light generation.

As shown in FIG. 3, when a charged particle (usually an electron) passes through a medium, such as water, at a speed greater than the speed of light in that medium, that particle will radiate from a cone behind itself, rather than in front, in a manner similar to that of a sonic wave created when breaking the sound barrier. The resultant Cherenkov light can be detected by photomultipliers or other detector types.

Figure 4:
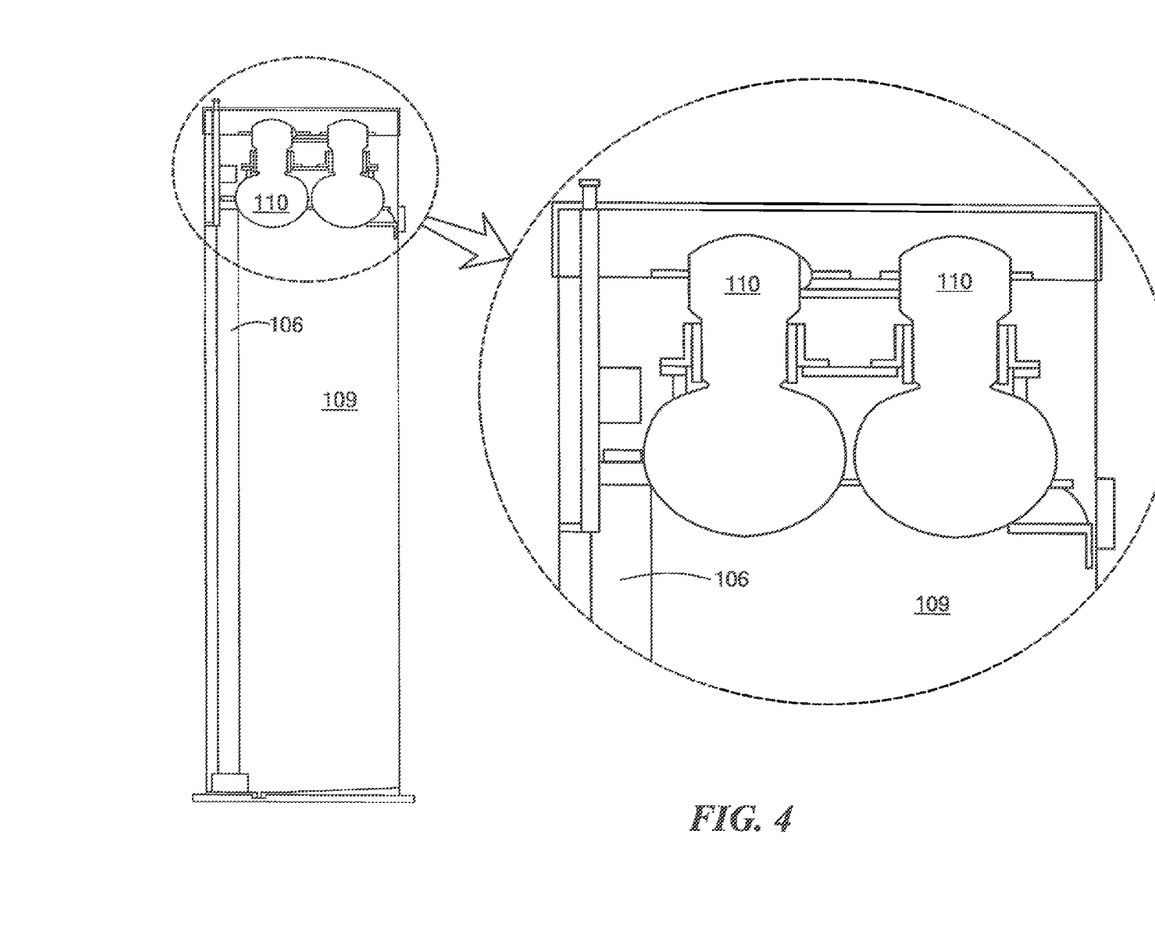
FIG. 4 is an exploded view of a gamma/neutron detector showing internal tubes to detect neutrons.
Figure 5:
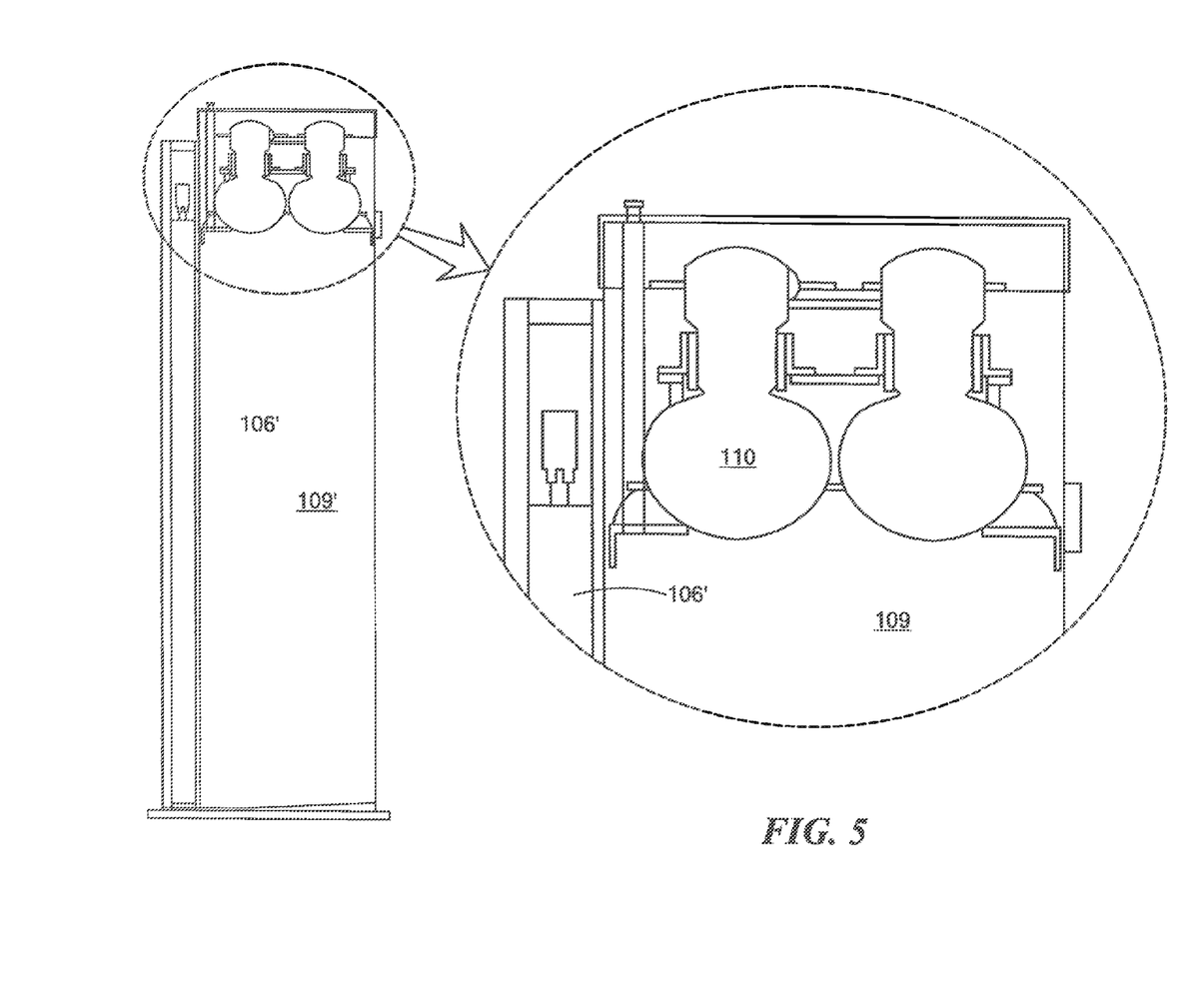
FIG. 5 is an exploded view of a gamma/neutron detector showing external tubes to detect neutrons.

In one embodiment shown in FIG. 4, the boron tubes 106 are internal to, i.e., contained within, the tank 109. In an alternative embodiment shown in FIG. 5, the boron tubes are external to the tank. In general, internal tubes conserve overall detector volume at the expense of some gamma sensitivity while external tubes maximize gamma sensitivity at the expense of higher detector volume.

Figure 6:
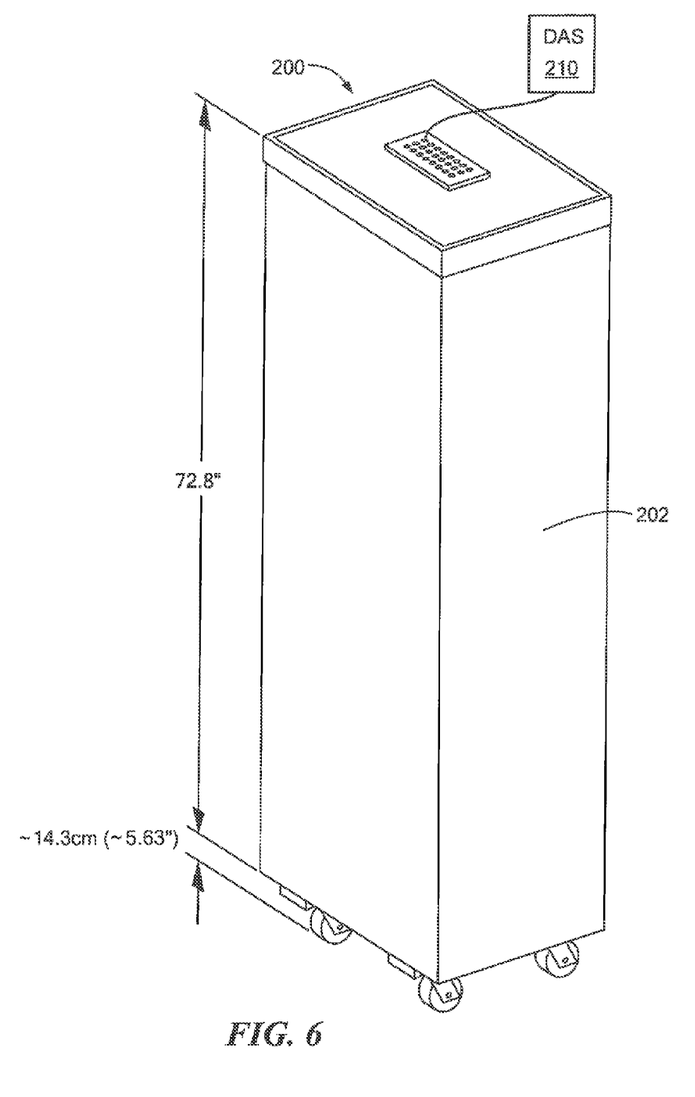
FIG. 6 is a schematic representation of a gamma/neutron detector having a data acquisition system.

FIG. 6 shows an exemplary gamma/neutron detector 200 having a tank 202 to hold a liquid, e.g., conditioned water, in accordance with exemplary embodiments of the invention. The detector 200 can include a data acquisition system (DAS) 210 to receive and process data from the amplifiers coupled to the boron tubes and from the PMTs. In one embodiment, the data acquisition system comprises a digital waveform digitizer of 12 bits, 75 Msps. Each waveform from the PMTs are digitized and time stamped. It is understood that processing the information can be performed in a manner well known to one of ordinary skill in the art.

Figure 6A:
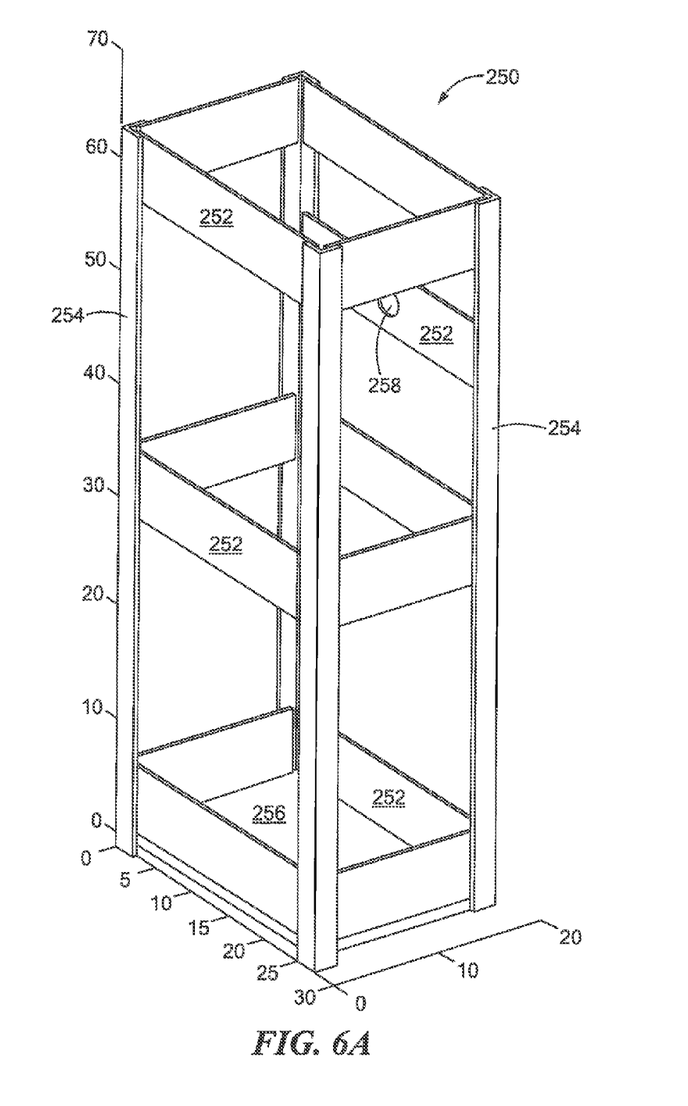
FIG. 6A is a schematic representation of a frame to support a reflective material forming a portion of an exemplary gamma/neutron detector.
Figure 7:
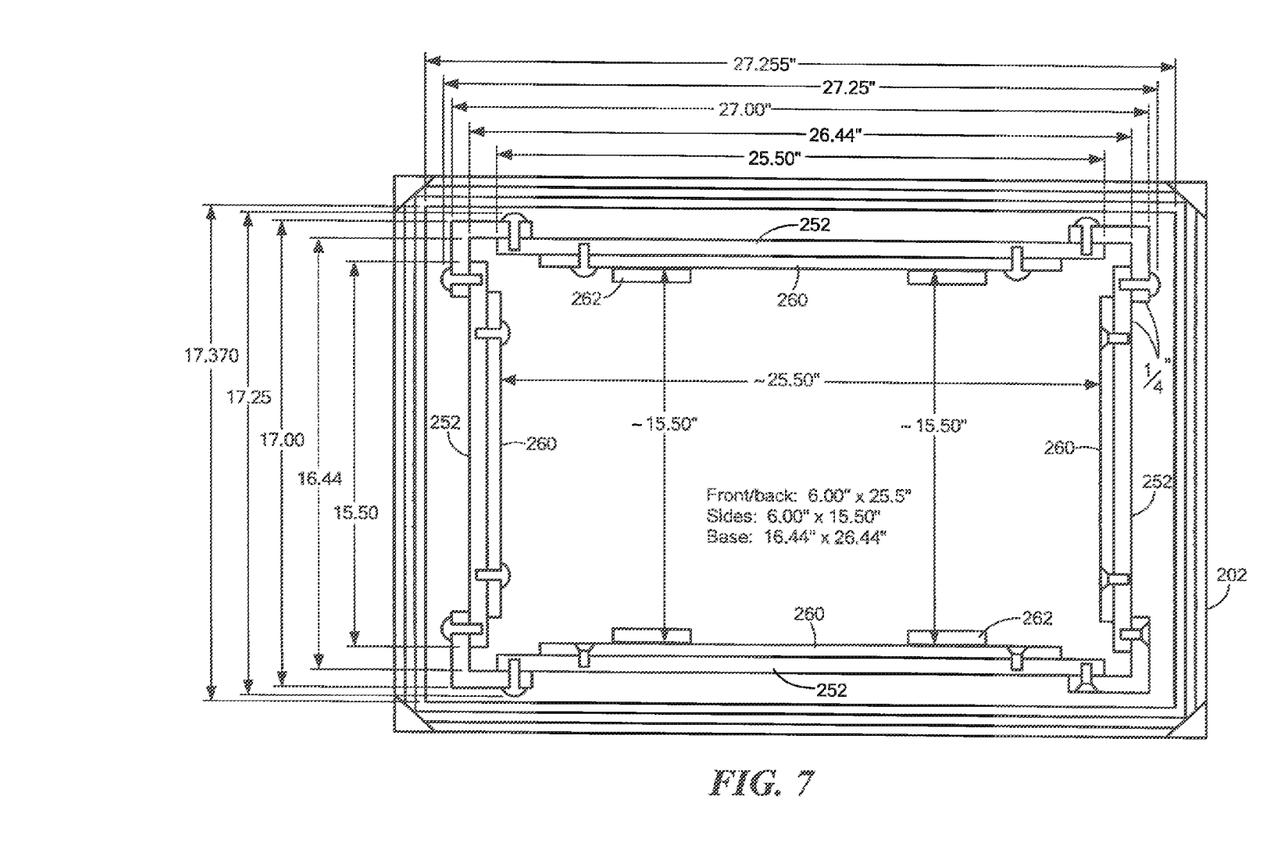
FIG. 7 is a top view of a frame within a tank of a gamma/neutron detector.

FIG. 6A shows an exemplary frame 250 comprising a series of sleeves 252 and posts 254. In one embodiment, the frame 250 includes a solid bottom 256. A circulation hole 258 enables water to flow through the sleeves 252. Any practical number of circulation holes 258 can be provided. The frame 250 fits inside the tank 202, as shown in FIG. 7, which includes exemplary dimensions. Circulation of the water through the detector conditions the water for maximum performance. Circulation rates of about 1 GPM through a 0.1 micron particulate filter and deionizing resin minimizes light absorption in the tank.

In an exemplary embodiment, the sleeves 252 and/or the posts 254 comprise polypropylene. The polypropylene frame, which can be fabricated with thin stock, e.g., ⅛", was used since it is relatively easy to fabricate and serve as a backing on which to mount the reflective material 260. While the polypropylene frame may provide relatively little structural strength, it prevents the reflective material 260 from floating in the water. The bottom of the tank can be angled to allow the water to be drained fully from the tank.

In one embodiment, a reflective material 260 is disposed on an inner surface of the sleeves 252. The reflective material 260 reflects light to enhance detection by the PMTs. In one particular embodiment, the reflective material 260 comprises expanded PTFE (ePTFE) to provide a diffuse reflector that has a reflectance of over 99% at the wavelength of interest for Cherenkov light and PMTs. It is understood that the thickness of the reflective material can vary to meet the needs of a particular application. An exemplary thickness for the reflective material ranges from about 0.5 mm to 3 mm.

Figure 7A:
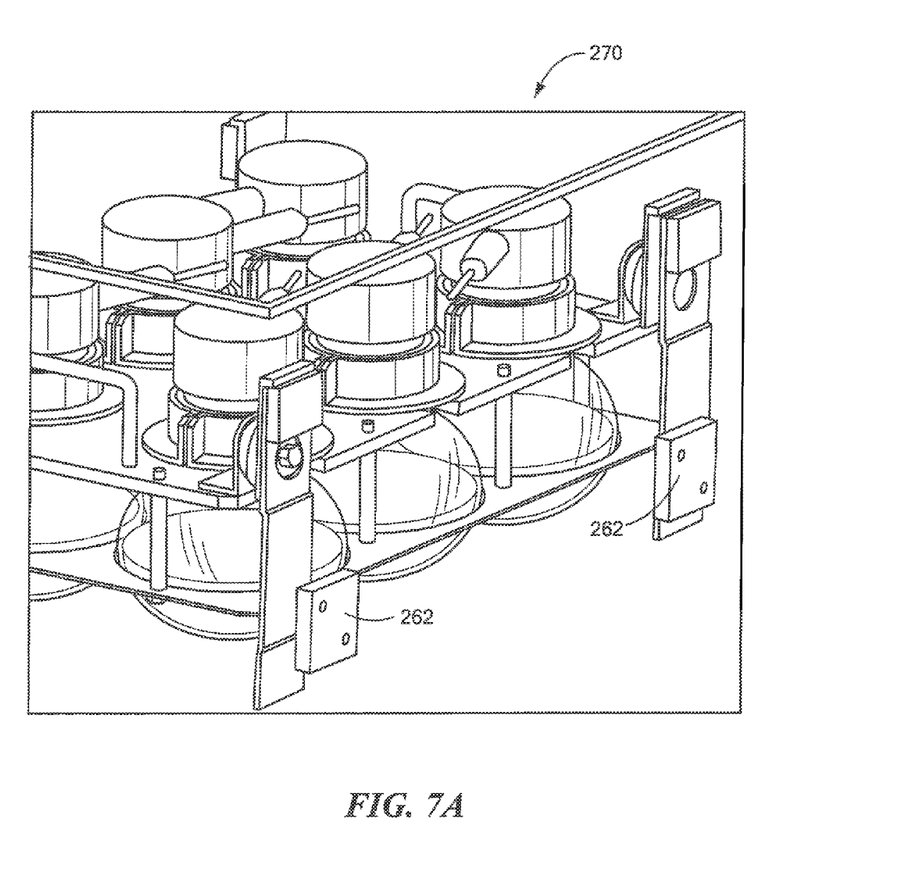
FIG. 7A is a schematic representation of a base member to support PMTs forming a part of a of a gamma/neutron detector.

In one particular embodiment, a base member 262 is secured to the sleeve for securing a PMT assembly 270, as shown in FIG. 7A While exemplary dimensions are shown for the illustrative detector, it is understood that the dimensions of the tank and other components can be varied to meet the needs of a particular embodiment. The exemplary modular unit is readily scalable to any desired geometry.

In one embodiment, the gamma detection has a selected threshold, e.g., 300 keV. That is, the detector is insensitive to photons below about 300 keV. Intrinsic efficiencies are in the order of 10-20 percent for neutrons and 20-50 percent for gammas.

It is understood that the tank can comprise any suitably rigid material. Exemplary materials include aluminum, stainless steel, and polypropylene. It is understood that materials generating rust, e.g., ferrous materials, should be avoided since rust will significantly degrade the transmission of light through the water. In addition, the detector 100 can be fabricated from non-toxic materials, unlike scintillator-type detectors.

Figure 8A:
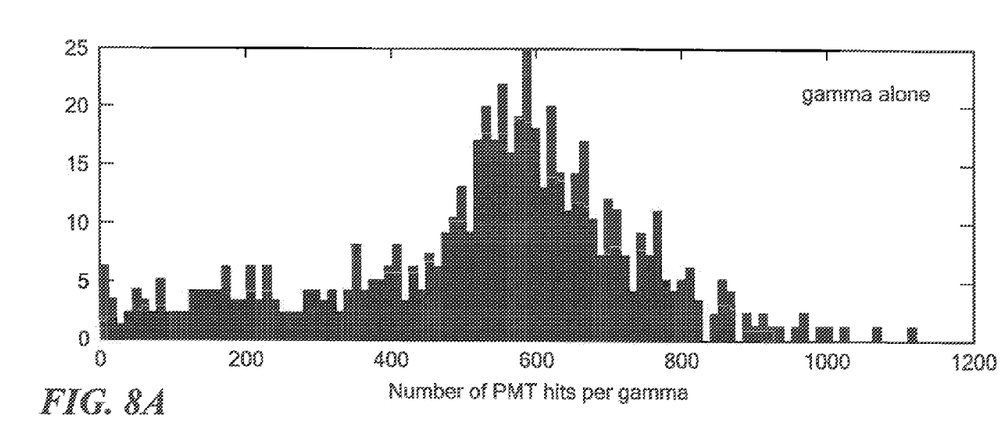
FIG. 8A is a graphical representation of gamma radiation and FIG. 8B is a graphical representation of gamma and neutron radiation.
Figure 8B:
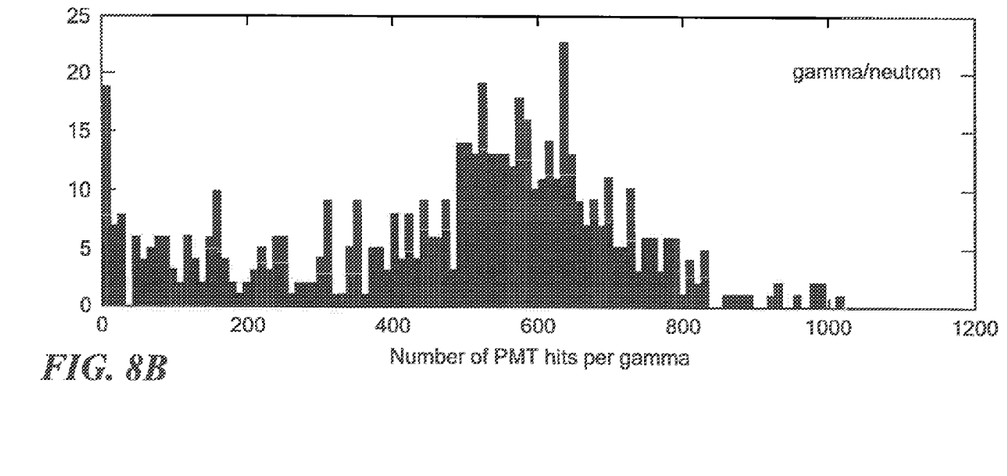

Exemplary embodiments of the gamma/neutron detector can be compared against a conventional Cherenkov detector. As can be seen in FIGS. 8A and 8B, for 10 MeV gammas, while the efficiency for gamma/neutron and gamma alone is the same, the number of Cherenkov photons created is smaller (see Table 1 below) due to loss of energy when going through the neutron detector.

TABLE 1

| gamma | gamma/neutron |
|---|---|
| 623.958 | 478.7715 |
| 1166.267 | 959.5701 |
| 1673.898 | 1401.103 |
| 2365.423 | 2092.515 |

Figure 9:
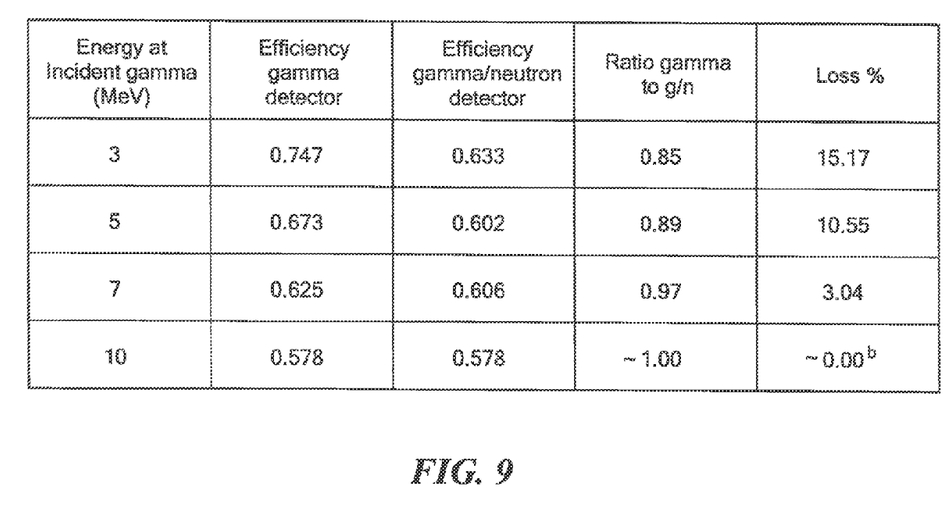
FIG. 9 is a tabular representation of gamma and neutron detection information.
Figure 10A:
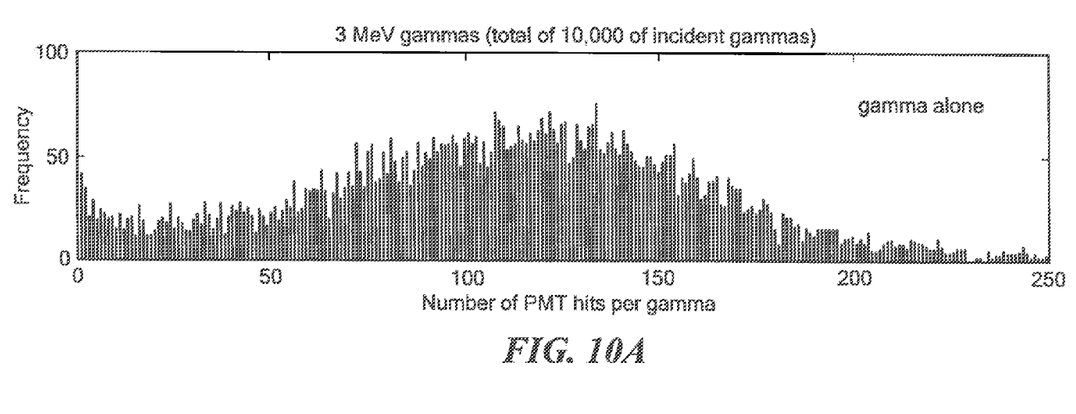
FIG. 10A is a graphical representation of 3 MeV gamma radiation and FIG. 10B is a graphical representation of gamma/neutron radiation.
Figure 10B:
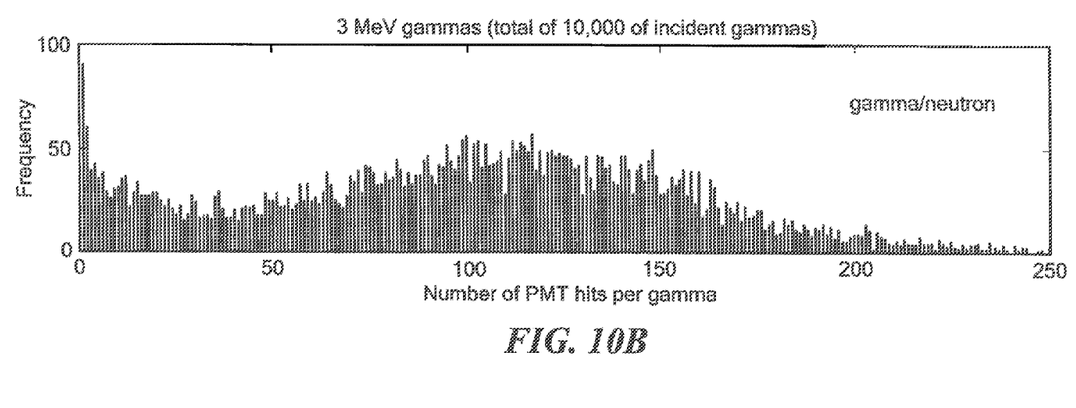

The spectra (frequency vs. number of PMT hits per gamma) indicate that the gamma/neutron, as compared to gamma, shifts the spectrum towards "fewer photons per gamma," i.e., to the left. Those gammas are still detectable because photons are still produced, but fewer per gamma. FIG. 9 shows further comparison information and FIGS. 10A and 10B show a comparison of 3 MeV gammas.

It is understood that exemplary embodiments of the invention are applicable to a wide variety of applications. For example, active and passive interrogation systems use radiation to interrogate an object, person or environment for objects of interest. As will be readily appreciate, it would be highly desirable to achieve gamma detection and neutron moderation in a cost efficient manner using systems that do not require toxic or flammable materials.

Figure 11:
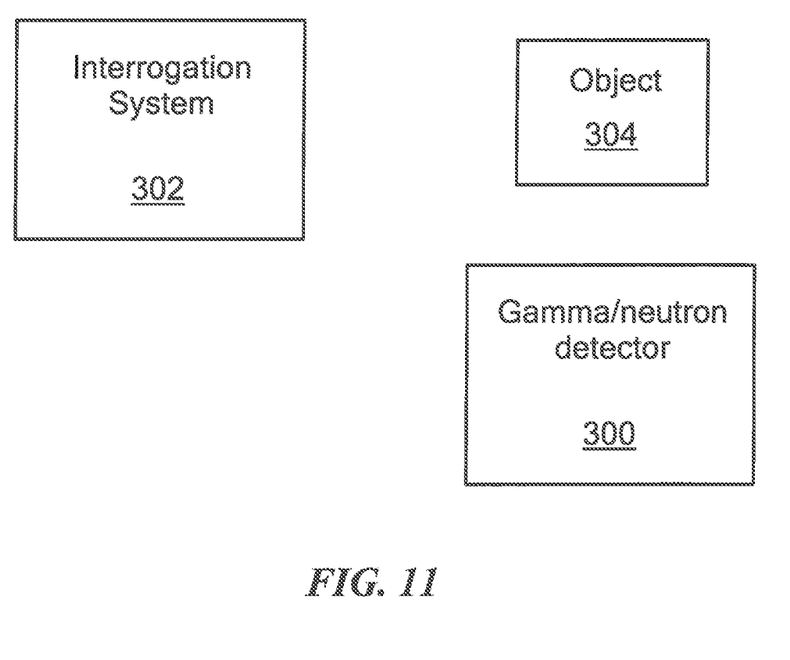
FIG. 11 is a high level block diagram of a radiation interrogation system having a gamma/neutron detector.

FIG. 11 shows an exemplary gamma/neutron detector 300 proximate an interrogation system 302 for irradiating an object of interest 304. Interrogation systems can be active or passive. The detector 300 can detect radiation in the interrogation 302 vicinity in order to determine the type of material being irradiated. Because the emitted radiation comprises either gammas or neutrons, or even combined fields of gammas and neutrons, it is highly desirable to detect both gammas and neutrons in order to accurately determine the nature of the inspected object.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A detector system, comprising:
   a tank to hold a liquid;
   a plurality of tubes adjacent the tank to detect neutrons; and
   a plurality of photon detectors to detect Cherenkov light generated by gamma radiation in the liquid,
   wherein the tank is configured to contain the liquid so that the liquid generates the Cherenkov light and moderates the neutrons.

2. The system according to claim 1, wherein the plurality of tubes are contained in the tank.

3. The system according to claim 1, wherein the liquid comprises conditioned water.

4. The system according to claim 3, wherein the water is contained in the tank.

5. The system according to claim 1, wherein the plurality of tubes comprises B-10 lined proportional tubes.

6. The system according to claim 1, wherein the photon detectors include photo multipliers.

7. The system according to claim 1, wherein the detector has an energy threshold of about 300 keV.

8. A detector system, comprising:
   a means for detecting neutrons comprising tubes; and
   a means for detecting Cherenkov light generated by gamma radiation comprising liquid in a tank.

9. The system according to claim 8, wherein the tubes are contained in the tank.

10. A method comprising:
    using a combined volume of conditioned water for gamma detection and neutron moderation.

11. The method according to claim 10, wherein the water is contained in a tank.

12. The method according to claim 11, further including employing a plurality of tubes adjacent the tank to detect neutrons.

13. The method according to claim 12, further including employing a plurality of photon detectors to detect Cherenkov light generated by gamma radiation in the water.

* * * * *